(12) United States Patent
Vemuri

(10) Patent No.: US 9,686,171 B1
(45) Date of Patent: Jun. 20, 2017

(54) SYSTEMS AND METHODS FOR ATTRIBUTING INPUT/OUTPUT STATISTICS NETWORKS TO REGION-MAPPED ENTITIES

(71) Applicant: Symantec Corporation, Mountain View, CA (US)

(72) Inventor: Hari Krishna Vemuri, Maharashtra (IN)

(73) Assignee: Veritas Technologies, Mountain View, CA (US)

( * ) Notice: Subject to any disclaimer, the term of this patent is extended or adjusted under 35 U.S.C. 154(b) by 307 days.

(21) Appl. No.: 13/947,780

(22) Filed: Jul. 22, 2013

(51) Int. Cl.
 *G06F 12/08* (2016.01)
 *H04L 12/26* (2006.01)

(52) U.S. Cl.
 CPC ................ *H04L 43/0876* (2013.01)

(58) Field of Classification Search
 CPC .... G06F 3/067; G06F 11/3485; G06F 13/102; G06F 3/0605; G06F 3/0665; G06F 21/53; G06F 3/0613; G06F 3/0629; G06F 3/0653; G06F 9/5077; G06F 11/3452; G06F 12/0842; G06F 12/0862; G06F 12/0866; G06F 12/0868; G06F 12/0888; G06F 13/14; G06F 17/302; G06F 2009/4557; G06F 2212/152; G06F 9/46; G06F 9/4856; G06F 9/5027; G06F 3/0689; G06F 3/0632; G06F 3/0644; G06F 2003/0692; G06F 2212/262; G06F 3/061; G06F 11/3409; G06F 11/3037; G06F 11/3495; G06F 17/30135; G06F 11/3055; G06F 3/0631; G06F 11/0712; G06F 11/201; G06F 2201/815; G06F 3/0604; H04L 67/1097; H04L 45/02;
(Continued)

(56) References Cited

U.S. PATENT DOCUMENTS

| 7,991,747 B1 | 8/2011 | Upadhyay et al. |
| 8,468,535 B1 * | 6/2013 | Keagy ................ G06F 8/63 718/1 |

(Continued)

OTHER PUBLICATIONS

"Disk I/O Performance", http://pubs.vmware.com/vsphere-4-esx-vcenter/index.jsp?topic=/com.vmware.vsphere.dcadmin.doc_41/vsp_dc_admin_guide/performance_statistics/c_troubleshoot_disk.html, as accessed Apr. 22, 2013, VMware vSphere 4—ESX and vCenter Server, (Sep. 22, 2012).
(Continued)

*Primary Examiner* — Kevin Bates
*Assistant Examiner* — Ranjan Pant
(74) *Attorney, Agent, or Firm* — FisherBroyles LLP

(57) ABSTRACT

A computer-implemented method for attributing input/output statistics in storage area networks to region-mapped entities may include (1) identifying a plurality of regions of at least one volume within a storage area network, (2) monitoring an input/output statistic of at least one component within the storage area network that is attributable to input/output to a region within the plurality of regions of the volume, (3) determining that a region-mapped entity is responsible for the input/output to the region of the volume, and (4) attributing the input/output statistic of the component to the region-mapped entity responsible for the input/output to the region of the volume. Various other methods, systems, and computer-readable media are also disclosed.

20 Claims, 8 Drawing Sheets

(58) Field of Classification Search
CPC ............. H04L 29/08549; H04L 45/124; H04L 67/2852; H04L 45/72; H04L 49/357; H04L 69/22; H04L 41/08; H04L 45/745; Y02B 60/1225; Y02B 60/165
See application file for complete search history.

(56) References Cited

U.S. PATENT DOCUMENTS

| | | | | | |
|---|---|---|---|---|---|
| 8,555,278 | B2* | 10/2013 | Janakiraman | ......... | G06F 3/0607 718/1 |
| 8,627,005 | B1* | 1/2014 | Glade | ............... | G06F 17/30867 711/114 |
| 8,706,962 | B2* | 4/2014 | Belluomini | ........... | G06F 3/0604 711/114 |
| 8,856,589 | B1* | 10/2014 | Glade | ................. | G06F 11/0712 714/11 |
| 2002/0120886 | A1* | 8/2002 | Nguyen | ................ | G06F 11/328 714/39 |
| 2010/0153617 | A1* | 6/2010 | Miroshnichenko | ..... | G06F 3/061 711/6 |
| 2010/0293559 | A1* | 11/2010 | Aciicmez | .............. | G06F 9/4411 719/324 |
| 2011/0072431 | A1* | 3/2011 | Cable | .................... | G06F 9/5077 718/1 |
| 2012/0096473 | A1* | 4/2012 | Durham | ................ | G06F 9/5077 718/105 |
| 2013/0332927 | A1* | 12/2013 | Tang | ................... | G06F 9/45545 718/1 |
| 2014/0052844 | A1* | 2/2014 | Nayak | ................ | H04L 67/1097 709/224 |
| 2014/0068224 | A1* | 3/2014 | Fan | ...................... | G06F 3/0613 711/206 |
| 2014/0173113 | A1 | 6/2014 | Vemuri et al. | | |

OTHER PUBLICATIONS

"Viewing Disk I/O Statistics", http://download.parallels.com/doc/psbm/v5/rtm/Parallels_Server_Bare_Metal_Users_Guide/32906.htm, as accessed Apr. 22, 2013, (Oct. 28, 2011).

Brambley, Rich, "How to get ESX Host and Virtual Machine Disk I/O Stats", http://vmetc.com/2008/06/25/how-to-get-esx-host-and-vm-disk-io-stats/, as accessed Apr. 22, 2013, (Jun. 25, 2008).

Siebert, Eric, "Avoid Storage I/O Bottlenecks With vCenter and Esxtop", http://www.petri.com/avoid-stroage-io-bottlenecks.htm, as accessed Apr. 22, 2013, Petri IT Knowledgebase, (Jan. 30, 2012).

"Tintri VMstore™", http://www.tintri.com/products/tintri-vmstore, as accessed Apr. 22, 2013, (Apr. 11, 2013).

"VKernel", http://www.vkernel.com/index.html?utm_source=redirects&utm_medium=aquisition&utm_campaign=vkernel_301_solutions, as accessed Apr. 22, 2013, Dell Inc., (On or before Apr. 22, 2013).

"Storage Manager", http://www.solarwinds.com/storage-manager.aspx#gotabs, as accessed Apr. 22, 2013, SolarWinds, (2003).

"Virtual Machines", http://www.manageengine.com/it360/help/meitms/applications/help/monitors/virtual-machines.html, as accessed Apr. 22, 2013, (On or before Apr. 22, 2013).

"VSphere", http://www.vmware.com/products/vsphere/features-storage-drs, as accessed Apr. 22, 2013, VMware, Inc., (On or before Apr. 22, 2013).

"[CentOS-virt] I/O load distribution", http://grokbase.com/t/centos/centos-virt/097vcrg2n1/i-o-load-distribution, as accessed Apr. 22, 2013, Grokbase, (Jul. 27, 2009).

"Amazon EC2", http://aws.amazon.com/ec2/, as accessed Apr. 22, 2013, Amazon Web Services, Inc., (Oct. 18, 2006).

Bhatt, Mehul, "Cisco Virtualization Solution for EMC VSPEX with VMware vSphere 5.1 for 100-125 Virtual Machines", http://www.cisco.com/c/en/us/td/docs/unified_computing/ucs/UCS_CVDs/ciscosol_vspex_v100v125.html, as accessed Apr. 22, 2013, Cisco Systems, Inc., (2013).

"XenServer Technical FAQ", http://support.citrix.com/article/CTX123996, as accessed Apr. 22, 2013, Citrix Systems, Inc., (Feb. 11, 2010).

"VMware", http://www.vmware.com/, as accessed Apr. 22, 2013, (Jan. 25, 1999).

"EMC", http://www.emc.com/index.htm?fromGlobalSelector, as accessed Apr. 22, 2013, (On or before Apr. 22, 2013).

\* cited by examiner

SYSTEMS AND METHODS FOR ATTRIBUTING INPUT/OUTPUT STATISTICS NETWORKS TO REGION-MAPPED ENTITIES

BACKGROUND

Today, individuals and organizations increasingly rely on virtualization technologies to simplify management of their IT infrastructures. For example, typical virtualization technologies may enable multiple virtualized servers, each with access to one or more virtual disks, to concurrently run on the same physical host, which may reduce the number of physical computing devices and/or physical storage devices that must be managed and maintained. In order to more effectively provision, maintain, and troubleshoot virtual environments, administrators may wish to understand how input/output traffic is distributed within the virtual environments and/or across the storage area networks that they employ.

Unfortunately, conventional techniques for determining how input/output traffic is distributed within virtual environments and/or storage area networks may present unwanted limitations when input/output traffic within the virtual environments and the storage area networks undergoes multiple layers of abstraction. For example, a typical hypervisor operating within a storage area network may include (1) a virtual-disk abstraction layer that transforms input/output requests to virtual disks into input/output requests to the storage-area-network volumes that store the virtual disks and (2) a storage-area-network abstraction layer that distributes the input/output request to the storage-area-network volumes across components of the storage area network. In this example, the virtual-disk abstraction layer may be unaware of the structure of the storage area network and therefore unable to determine how input/output traffic to the virtual disks is distributed across the storage area network, and the storage-area-network abstraction layer may be unaware of the virtual disks associated with the input/output traffic to the storage-area-network volumes and, therefore, unable to determine how input/output traffic to the virtual disks is distributed across the storage area network. Accordingly, the instant disclosure identifies a need for additional and improved systems and methods for attributing input/output statistics in storage area networks to region-mapped entities.

SUMMARY

As will be described in greater detail below, the instant disclosure generally relates to systems and methods for attributing input/output statistics in storage area networks to region-mapped entities. In one example, a computer-implemented method for attributing input/output statistics in storage area networks to region-mapped entities may include (1) identifying a plurality of regions of at least one volume within a storage area network, (2) monitoring an input/output statistic of at least one component within the storage area network that may be attributable to input/output to a region within the plurality of regions of the volume, (3) determining that a region-mapped entity may be responsible for the input/output to the region of the volume, and (4) attributing the input/output statistic of the component to the region-mapped entity responsible for the input/output to the region of the volume.

In some examples, the region-mapped entity may include a virtual disk that may be mapped to the region of the volume, and the step of determining that the region-mapped entity may be responsible for the input/output to the region of the volume may include determining that the virtual disk is mapped to at least the region of the volume.

In at least one example, the step of monitoring the input/output statistic of the component that may be attributable to the input/output to the region of the volume may include (1) receiving, at a hypervisor through which the virtual disk may be accessible, at least one input/output request for the region of the volume and (2) monitoring an input/output statistic of the component that is attributable to the input/output request for the region of the volume, and the step of attributing the input/output statistic of the component to the region-mapped entity responsible for the input/output to the region of the volume may include attributing the input/output statistic of the component that is attributable to the input/output request for the region of the volume to the virtual disk.

In certain examples, the input/output request for the region of the volume may include identification information that indicates that the volume may be the target of the input/output request (e.g., a target id and/or a logical unit number) and/or address information that indicates that the region of the volume may be the target of the input/output request (e.g., an offset and/or a length).

In some examples, the region-mapped entity may include an application, and the step of determining that the region-mapped entity may be responsible for the input/output to the region of the volume may include determining that the application may be mapped to at least the region of the volume.

In at least one example, the step of determining that the application may be mapped to at least the region of the volume may include determining that the application may be configured to access at least a portion of a virtual disk that may be mapped to at least the region of the volume.

In some examples, the region-mapped entity may include one of a plurality of virtual disks accessible via a virtual machine. In at least one example, the volume within the storage area network may include a logical unit identified by a logical unit number.

In some examples, the method for attributing input/output statistics in storage area networks to region-mapped entities may further include (1) monitoring an additional input/output statistic of the component within the storage area network that may be attributable to input/output to an additional region within the plurality of regions of the volume, (2) determining that an additional region-mapped entity may be responsible for the input/output to the additional region of the volume, and (3) attributing the additional input/output statistic of the component to the additional region-mapped entity responsible for the input/output to the additional region of the volume. In at least one example, the region-mapped entity may include a first virtual disk that is mapped to at least the region of the volume, and the additional region-mapped entity may include a second virtual disk that is mapped to at least the additional region of the volume that may be separate and distinct from the first virtual disk.

In some examples, the method for attributing input/output statistics in storage area networks to region-mapped entities may further include reporting the input/output statistic of the component that may be attributed to the region-mapped entity responsible for input/output to the region of the volume.

In some examples, the method for attributing input/output statistics in storage area networks to region-mapped entities may further include determining, based at least in part on attributing the input/output statistic of the component to the region-mapped entity responsible for the input/output to the region of the volume, how input/output traffic for which the region-mapped entity may be responsible may be distributed across the storage area network.

In one embodiment, a system for implementing the above-described method may include (1) an identifying module that identifies a plurality of regions of at least one volume within a storage area network, (2) a monitoring module that monitors an input/output statistic of at least one component within the storage area network that may be attributable to input/output to a region within the plurality of regions of the volume, (3) a determining module that determines that a region-mapped entity may be responsible for the input/output to the region of the volume, (4) an attributing module that attributes the input/output statistic of the component to the region-mapped entity responsible for the input/output to the region of the volume, and (5) at least one processor that executes the identifying module, the monitoring module, the determining module, and the attributing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a plurality of regions of at least one volume within a storage area network, (2) monitor an input/output statistic of at least one component within the storage area network that may be attributable to input/output to a region within the plurality of regions of the volume, (3) determine that a region-mapped entity may be responsible for the input/output to the region of the volume, and (4) attribute the input/output statistic of the component to the region-mapped entity responsible for the input/output to the region of the volume.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
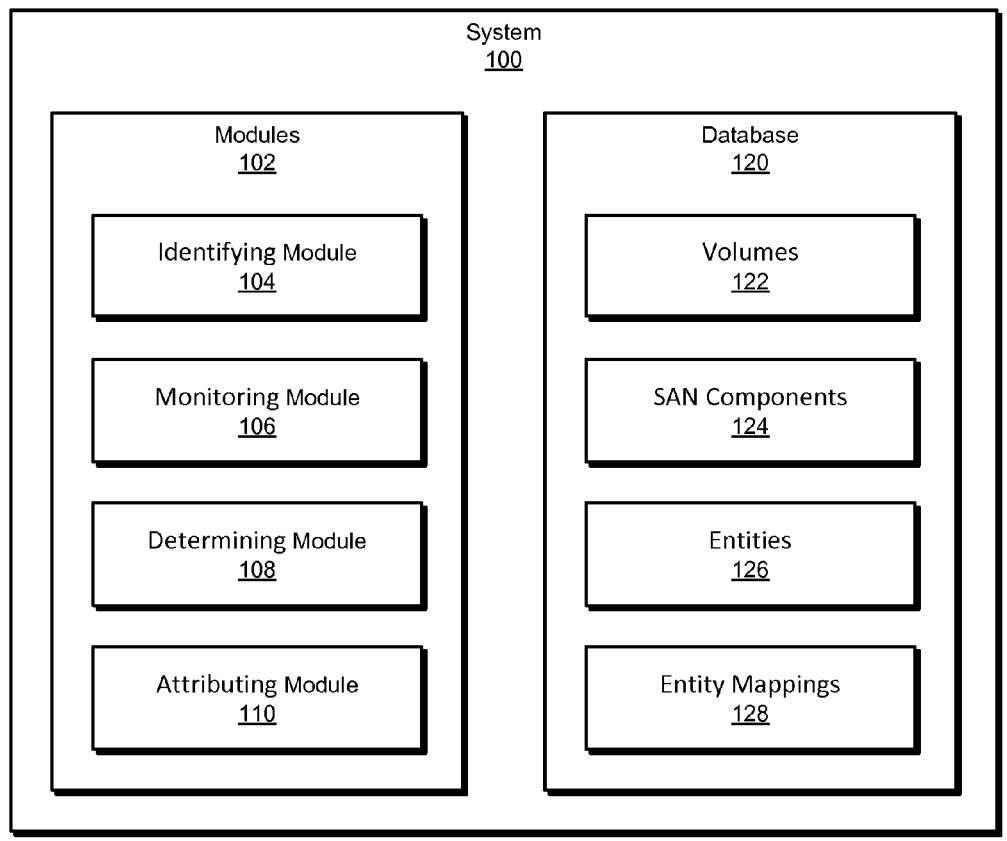
FIG. 1 is a block diagram of an exemplary system for attributing input/output statistics in storage area networks to region-mapped entities.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for attributing input/output statistics in storage area networks to region-mapped entities. As will be explained in greater detail below, by (1) monitoring input/output traffic within storage area networks at a volume-region level and (2) determining how region-mapped entities (e.g., virtual disks or applications) are mapped to specific volume regions, the systems and methods described herein may attribute input/output statistics (e.g., load statistics) in storage area networks to the region-mapped entities that are responsible for them. Furthermore, in some examples, by attributing input/output statistics in storage area networks to region-mapped entities, these systems and methods may discover how input/output traffic of the region-mapped entities is distributed across the physical components of a storage area network. Embodiments of the instant disclosure may also provide various other advantages and features, as discussed in greater detail below.

Figure 2:
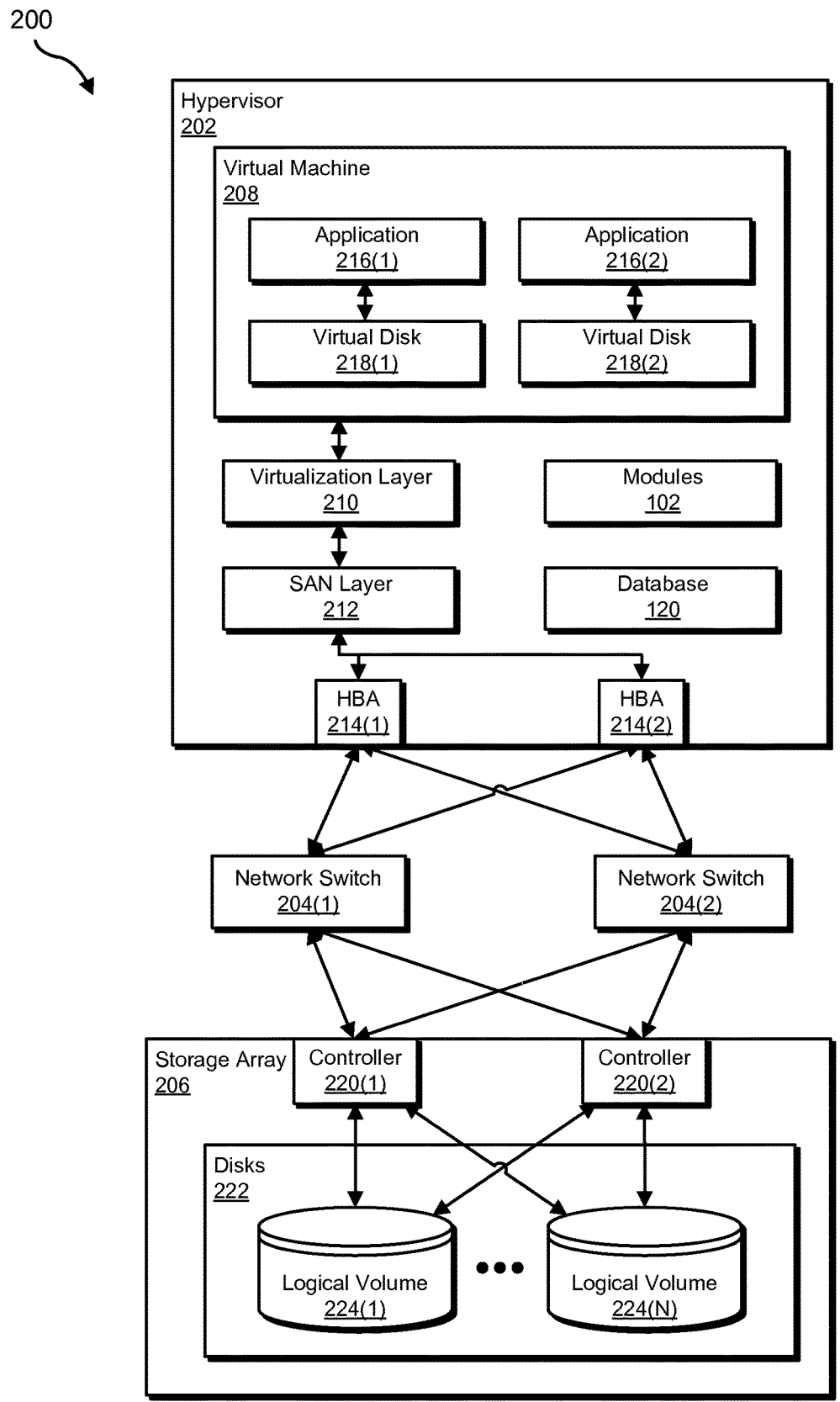
FIG. 2 is a block diagram of an exemplary system for attributing input/output statistics in storage area networks to region-mapped entities.

The following will provide, with reference to FIGS. 1-2, detailed descriptions of exemplary systems for attributing input/output statistics in storage area networks to region-mapped entities. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for attributing input/output statistics in storage area networks to region-mapped entities. As illustrated in this figure, exemplary system 100 may include one or more modules 102 for performing one or more tasks. For example, and as will be explained in greater detail below, exemplary system 100 may include an identifying module 104 that identifies a plurality of regions of at least one volume within a storage area network. Exemplary system 100 may also include a monitoring module 106 that monitors an input/output statistic of at least one component within the storage area network that may be attributable to input/output to a region within the plurality of regions of the volume.

In addition, and as will be described in greater detail below, exemplary system 100 may include a determining module 108 that determines that a region-mapped entity may be responsible for the input/output to the region of the volume. Exemplary system 100 may also include an attributing module 110 that attributes the input/output statistic of the component to the region-mapped entity responsible for the input/output to the region of the volume. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., hypervisor 202, network switches 204(1) and 204(2), storage array 206, and/or virtual machine 208), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include volumes 122 for storing information about one or more volumes, SAN components 124 for storing information about one or more storage-area-network components, entities 126 for storing information about one or more region-mapped entities, and entity mappings 128 for storing information about one or more entity mappings.

Database 120 may represent portions of a single database or computing device or a plurality of databases or computing devices. For example, database 120 may represent a portion of hypervisor 202 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as hypervisor 202 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a hypervisor 202 in communication with a storage array 206 via network switches 204(1) and 204(2). Hypervisor 202 may be programmed with one or more of modules 102 and/or may store all or a portion of the data in database 120. In at least one example, system 200 may represent at least a portion of a storage area network.

In one embodiment, one or more of modules 102 from FIG. 1 may, when executed by at least one processor of hypervisor 202, network switches 204(1) and 204(2), and/or storage array 206, facilitate hypervisor 202, network switches 204(1) and 204(2), and/or storage array 206 in attributing input/output statistics in system 200 to region-mapped entities. For example, and as will be described in greater detail below, one or more of modules 102 may cause hypervisor 202, network switches 204(1) and 204(2), and/or storage array 206 to (1) identify a region within logical volumes 224(1)-(N), (2) monitor an input/output statistic of at least one component of system 200 (e.g., hypervisor 202, host bus adapters 214(1) and 214(2), network switches 204(1) and 204(2), storage array 206, controllers 220(1) and 220(2), disks 222, and/or logical volumes 224(1)-(N)) that may be attributable to input/output to the region within logical volumes 224(1)-(N), (3) identify a region-mapped entity (e.g., applications 216(1) and 216(2) and/or virtual disks 218(1) and 218(2)) that is responsible for the input/output to the region within logical volumes 224(1)-(N), and (4) attribute the input/output statistic to the region-mapped entity responsible for the input/output to the region within logical volumes 224(1)-(N).

Hypervisor 202 generally represents any host within a storage area network and/or any type or form of virtualization platform capable of running and/or managing multiple virtual machines on a single physical computing device. As shown in FIG. 2, hypervisor 202 may be configured to run and manage virtual machine 208. Virtual machine 208 generally represents any virtualization (including hardware-assisted virtualization), implementation, or emulation of a physical computing device. In one example, virtual machine 208 may represent a virtual machine configured to run one or more applications. For example, virtual machine 208 may be configured to run applications 216(1) and 216(2).

Applications 216(1) and 216(2) generally represent applications configured to run on virtual machines and store data to and read data from virtual disks accessible via the virtual machines. Virtual disks 218(1) and 218(2) generally represent any virtual disks accessible via a virtual machine. As used herein, the term "virtual disk" may refer to a disk that may appear to a computing device or operating system as a physical disk. A virtual disk may emulate any type of physical disk, such as a hard drive, an optical disk, a network share, and/or any other physical storage entity. In at least one example, virtual disk 218(1) and virtual disk 218(2) may correspond to one or more files (e.g., one or more .VMDK or .VHD files) stored within logical volumes 224(1)-(N).

Virtualization layer 210 and SAN layer 212 generally represent portions of a software layer of hypervisor 202. Virtualization layer 210 generally represents a software abstraction layer of a hypervisor that manages virtualization of computing devices and/or storage devices in virtual environments. For example, virtualization layer 210 may manage the virtualization of virtual machine 208 and virtual disks 218(1) and 218(2). In at least one example, one or more of modules 102 may represent a portion of virtualization layer 210.

SAN layer 212 generally represents a software abstraction layer of a hypervisor that manages (e.g., transmits, receives, and/or routes) input/output request within a storage area network. For example, SAN layer 212 may route input/output requests from hypervisor 202 to storage array 206. Examples of SAN layer 212 may include MICROSOFT MULTIPATH I/O, VMWARE's NATIVE MULTIPATHING PLUG-IN, and/or SYMANTEC's VERITAS DYNAMIC MULTIPATHING. In at least one example, one or more of modules 102 may represent a portion of SAN layer 212.

Host bus adapters (HBAs) 214(1) and 214(2) generally represent host adapters configured to facilitate communication between hypervisor 202 and one or more additional network or storage devices (such as, for example, network switches 204(1) and 204(2) and/or storage array 206) via an external bus or communication channel.

Figure 3:
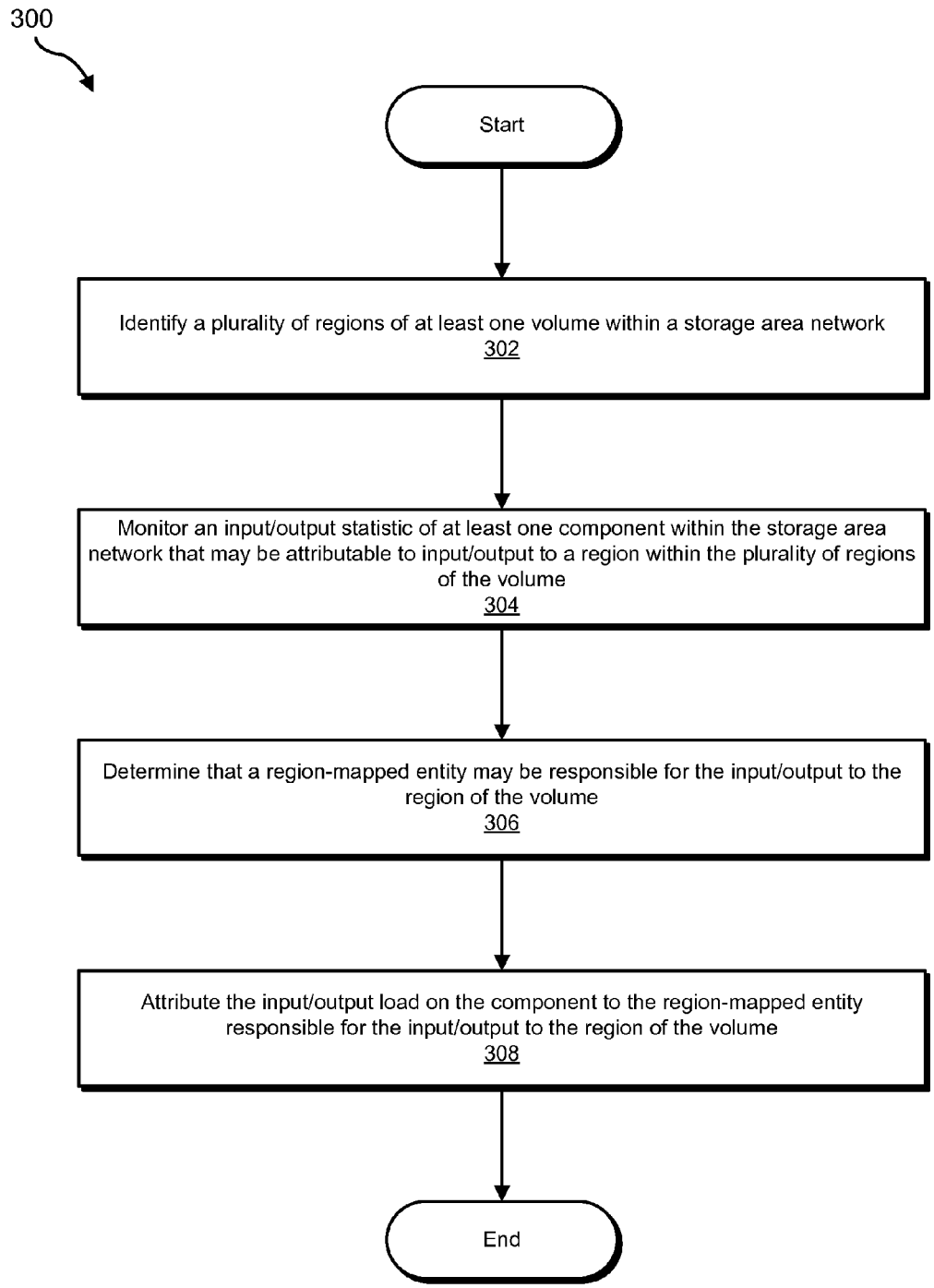
FIG. 3 is a flow diagram of an exemplary method for attributing input/output statistics in storage area networks to region-mapped entities.

Network switches 204(1) and 204(2) generally represent intermediary devices that facilitate communication between two or more other devices within a computer network. For example, network switches 204(1) and 204(2) in FIG. 2 may facilitate communication between hypervisor 202 and storage array 206. Examples of network switches 204(1) and 204(2) include, without limitation, network bridges, multi-layer switches, network hubs, signal repeaters, packet switches, routers, or any other suitable networks switches. Although FIGS. 2 and 3 illustrate network switches 204(1)

and 204(2) operating in parallel between hypervisor 202 and storage array 206, additional network topologies may include two or more network switches operating in series. In at least one example, network switches 204(1) and 204(2) may represent a portion of a SAN fabric (e.g., SAN fabric 880 in FIG. 8).

Storage array 206 generally represents any storage system or device (such as a disk array) capable of storing data for a host computing system (such as data for applications or virtual machines managed by hypervisor 202). As shown, storage array 206 may include disks 222 that have been logically divided into a plurality of logical units (e.g., logical volumes 224(1)-(N)), each of which may represent a logical reference to a physical portion of disks 222. Logical volumes 224(1)-(N) may represent a disk, a section of a disk, an entire disk array, and/or a section of a disk array within storage array 206. Examples of storage array 206 may include storage devices 890(1)-(N) and/or intelligent storage array 895 in FIG. 8.

Controllers 220(1) and 220(2) generally represent storage controllers configured to (1) facilitate communication between storage array 206 and one or more additional network or computing devices (such as, for example, network switches 204(1) and 204(2) and/or hypervisor 202) via an external bus or communication channel and/or (2) manage input/output to disks 222 and/or logical volumes 224(1)-(N).

Although not illustrated in FIG. 2, in some examples, hypervisor 202 may include one or more disks and/or logical volumes. These disks and/or logical volumes may be enclosed within hypervisor 202 and/or attached to hypervisor 202 via internal bus interfaces (e.g., internal PCI, SATA, and/or SCSI bus interfaces). In at least one example, SAN layer 212 may communicate directly with these disks and/or logical volumes.

FIG. 3 is a flow diagram of an exemplary computer-implemented method 300 for attributing input/output statistics in storage area networks to region-mapped entities. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify a plurality of regions of at least one volume within a storage area network. For example, at step 302 identifying module 104 may, as part of hypervisor 202 in FIG. 2, identify regions of logical volumes 224(1)-(N). Using FIG. 4 as an additional example, identifying module 104 may identify some or all of regions 400(1)-(N) of logical volume 224(1).

As used herein, the term "region" may refer to any portion of one or more volumes. For example, a region may include a unit of one or more volumes (such as, for example, a block, a plurality of blocks, a sector, a plurality of sectors, a cluster, a plurality of clusters, an extent, a plurality of extents, and/or any other suitable unit of a storage system). In some examples, a region of a volume may include a plurality of contiguous units of at least one volume and/or a plurality of noncontiguous units of at least one volume. In at least one example, regions of one or more volumes may be contiguous and/or noncontiguous.

Figure 4:
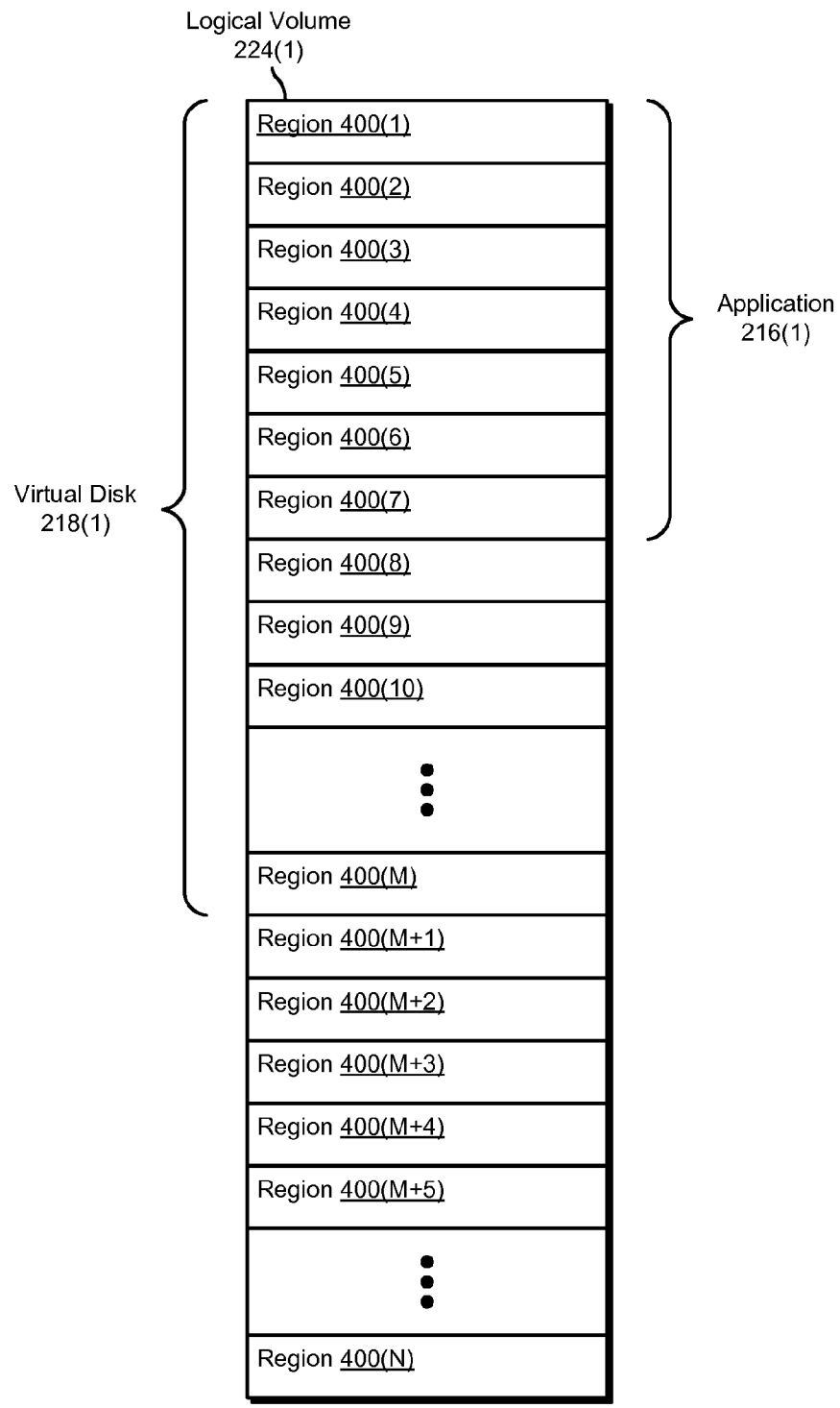
FIG. 4 is a block diagram of an exemplary volume within a storage area network.
Figure 5:
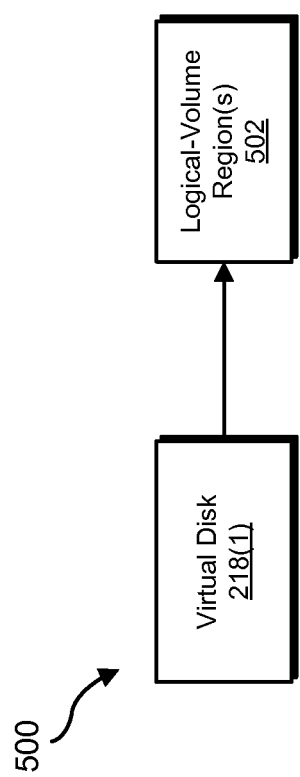
FIG. 5 is a block diagram of exemplary entity mappings.

In some examples, a region may include at least a portion of one or more volumes to which a region-mapped entity has been mapped. For example, a region of logical volume 224(1) may include a portion of logical volume 224(1) that stores all or a portion of virtual disk 218(1). FIG. 4 is a block diagram of an exemplary configuration of logical volume 224(1). As shown in FIG. 4, logical volume 224(1) may include a plurality of regions 400(1)-(N). In this example, regions 400(1)-(M) may represent the regions of logical volume 224(1) to which virtual disk 218(1) has been mapped, and regions 400(1)-(7) may represent the regions of logical volume 224(1) to which application 216(1) has been mapped.

The term "volume," as used herein, may refer to any collection of data and/or any physical, logical, or virtualized unit of data and/or storage. In at least one example, a volume may represent a unique and discrete addressable unit or logical unit that may reside inside one or more simple or array storage devices. In some examples, a volume may be exposed and accessed via a logical unit number (LUN).

As used herein, the term "storage area network" may refer to any storage network that includes a collection of computing devices (e.g., hypervisor 202 in FIG. 2) and storage devices (e.g., storage array 206 in FIG. 2) that are connected via a network. In a typical storage area network, access to storage devices is provided to computing devices via interconnecting hardware (e.g., routers, switches, hubs, and bridges). Examples of storage area networks may include system 200 in FIG. 2 and servers 840 and 845, SAN fabric 880, intelligent storage array 895, and devices 890(1)-(N) in FIG. 8.

Returning to FIG. 3, the systems described herein may perform step 302 in any suitable manner. In one example, identifying module 104 may identify the regions of one or more volumes within a storage area network as part of identifying the one or more volumes. For example, identifying module 104 may identify the regions of logical volume 224(1) as part of identifying logical volume 224(1). In some examples, identifying module 104 may identify a volume by reading a configuration file associated with the volume. For example, identifying module 104 may identify logical volumes 224(1)-(N) by reading a configuration file of system 200, hypervisor 202, and/or virtual machine 208 that indicates that hypervisor 202 is configured to access logical volumes 224(1)-(N) and/or that virtual machine 208 is configured to access a virtual disk that is stored within logical volumes 224(1)-(N).

In some examples, identifying module 104 may identify a volume within a storage area network by querying a virtual environment that employs the volume for information that identifies the volume. For example, identifying module 104 may query virtualization layer 210 for information that indicates that hypervisor 202 is configured to access logical volumes 224(1)-(N) and/or that virtual machine 208 is configured to access a virtual disk that is stored within logical volumes 224(1)-(N).

In at least one example, identifying module 104 may identify a region of a volume or a volume within a storage area network by identifying (e.g., intercepting, receiving, or retrieving) one or more input/output request that identify the region or the volume. In some contexts, identifying module 104 may represent a part of a hypervisor's software abstraction layer that is configured to route input/output traffic across a storage area network and may identify input/output requests to regions of volumes as part of the software abstraction layer. For example, identifying module 104 may represent a part of SAN layer 212 and may identify regions of logical volumes 224(1)-(N) and/or logical volumes 224

(1)-(N) by receiving input/output requests from virtualization layer 210 that are directed to regions of logical volumes 224(1)-(N).

In some examples, identifying module 104 may identify specific regions of a volume. For example, identifying module 104 may identify specific regions of a volume by identifying a region-mapped entity that is mapped to the specific regions of the volume. Using FIG. 4 as an example, identifying module 104 may identify regions 400(1)-(M) of logical volume 224(1) by identifying virtual disk 218(1) that is mapped to regions 400(1)-(M) of logical volume 224(1).

At step 304, one or more of the systems described herein may monitor an input/output statistic of at least one component within the storage area network that may be attributable to input/output to a region within the plurality of regions of the volume. For example, at step 304 monitoring module 106 may, as part of hypervisor 202 in FIG. 2, monitor an input/output statistic of at least one component of system 200 (such as, for example, HBAs 214(1) and 214(2), network switches 204(1) and 204(2), controllers 220(1) and 220(2), and/or one or more of disks 222) that may be attributable to input/output to a region of logical volumes 224(1)-(N). Using FIG. 4 as another example, monitoring module 106 may monitor an input/output statistic of at least one component of system 200 that may be attributable to input/output to region 400(1).

The term "input/output statistic," as used herein, generally refers to any statistic or metric that indicates how input/output to a region of a volume affects and/or is affected by a component in a storage area network. Examples of input/output statistics include, without limitation, load statistics, latency statistics, utilization statistics, throughput statistics, error statistics, and/or any other kind of performance statistic.

As used herein, the term "component" generally refers to any physical or logical portion of a storage area network for which separate and distinct input/output statistics may be determined. In one example, components of a storage area network may include each physical device within the storage area network. Using FIG. 2 as an example, components of system 200 may include hypervisor 202, network switches 204(1) and 204(2), and storage array 206. In some examples, components of a storage area network may include subcomponents of physical devices within a storage area network. Examples of subcomponents may include, without limitation, host bus adapters, ports, processors, controllers, and/or disk drives. Using FIG. 2 as an example, subcomponents of system 200 may include HBAs 214(1) and 214(2), individual ports of network switches 204(1) and 204(2), controllers 220(1) and 220(2), and/or one or more of disks 222.

In some examples, components of a storage area network may also include paths or path segments through which computing devices within a storage area network access storage devices within the storage area network. In at least one example, components of a storage area network may include each logical device within the storage area network. Using FIG. 2 as an example, components of system 200 may include logical volumes 224(1)-(N).

Returning to FIG. 3, the systems described herein may perform step 304 in any suitable manner. In one example, monitoring module 106 may monitor an input/output statistic of a component that may be attributable to input/output to a region of a volume by (1) identifying (e.g., intercepting, receiving, or retrieving) one or more input/output requests for the region of the volume and (2) determining how the input/output requests for the region of the volume affect the input/output statistic of the component. For example, monitoring module 106 may monitor the load of a component that may be attributable to input/output to a region of a volume by (1) receiving at least one input/output request for the region of the volume and (2) determining the load on the component that is caused by fulfilling the input/output request. By monitoring input/output statistics of components within a storage area network at a volume-region level, monitoring module 106 may determine how input/output statistics of the components are affected by each region of each volume in the storage area network.

In some examples, monitoring module 106 may determine that an input/output request is directed to a region of a volume using information contained within the input/output request. For example, a typical input/output request may include information that identifies the volume that is the target of the input/output request (e.g., a target ID and/or a logical unit number), information that indicates the source of the input/output request (such as, for example, an application or virtual machine tag), and/or information that identifies the region of the volume that is the target of the input/output request (e.g., an offset and/or a length). Monitoring module 106 may use this information to associate input/output requests and/or region-level input/output statistics of components with specific regions of a volume.

In one example, monitoring module 106 may monitor region-level input/output statistics of a component within the storage area network as part of the component itself. Additionally or alternatively, monitoring module 106 may monitor region-level input/output statistics of multiple components as part of a hypervisor's storage-area-network software abstraction layer (e.g., SAN layer 212 in FIG. 2) that transmits, receives, and/or routes input/output requests within a storage area network and therefore understands how the input/output requests affect components within the storage area network. For example, monitoring module 106 may determine that an input/output request to a region of a volume loads one or more components of a storage area network based on the storage-area-network abstraction layer having chosen to route the input/output request through the one or more components.

At step 306, one or more of the systems described herein may determine that a region-mapped entity may be responsible for the input/output to the region of the volume. For example, at step 306 determining module 108 may, as part of hypervisor 202 in FIG. 2, determine that application 216(1), application 216(2), virtual disk 218(1), and/or virtual disk 218(2) may be responsible for input/output to one or more regions of logical volumes 224(1)-(N). Using FIG. 4 as another example, determining module 108 may determine that virtual disk 218(1) may be responsible for input/output to regions 400(1)-(M) and/or that application 216(1) may be responsible for input/output to regions 400(1)-(7).

As used herein, the term "region-mapped entity" may refer to any entity that has been mapped to one or more regions of one or more volumes. Examples of region-mapped entities include, without limitation, virtual disks (e.g., a virtual-machine disk), applications, and/or file systems. Using FIG. 2 as an example, application 216(1), application 216(2), virtual disk 218(1), and/or virtual disk 218(2) may be mapped to one or more regions of one or more of logical volumes 224(1)-(N). Using FIG. 4 as another example, virtual disk 218(1) may be mapped to at least regions 400(1)-(M) of logical volume 224(1), and application 216(1) may be mapped to at least regions 400(1)-(7) of logical volume 224(1). In some examples, region-mapped entities may be mapped to a plurality of contiguous and/or noncontiguous regions of one or more volumes.

In some examples, an entity may be considered mapped to a region of a volume if the entity is an abstraction or virtualization of the region of the volume and/or if the entity is configured to use such an abstraction or virtualization of the region of the volume.

Figure 6:
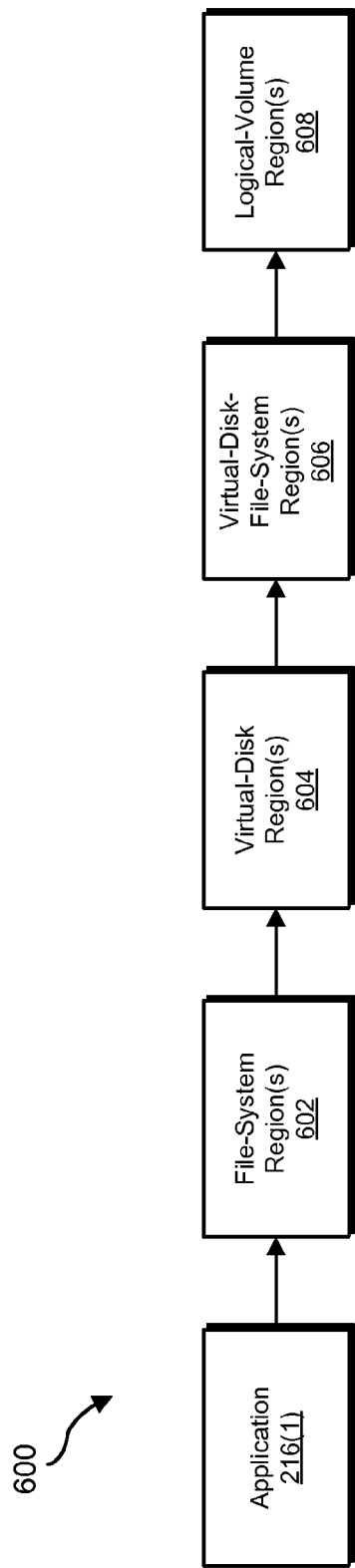
FIG. 6 is a block diagram of exemplary entity mappings.

In some examples, region-mapped entities may be mapped to regions of one or more volumes through one or more levels of abstractions or mappings. Using FIG. 5 as an example, virtual disk 218(1) may be mapped to one or more logical-volume region(s) 502 through one level of abstraction. Using FIG. 6 as another example, application 216(1) may be mapped to logical-volume region(s) 608 through multiple levels of abstraction. For example as shown in FIG. 6, application 216(1) may be mapped to one or more file-system region(s) 602, file-system region(s) 602 may be mapped to one or more virtual-disk region(s) 604, virtual-disk region(s) 604 may be mapped to one or more virtual-disk-file-system region(s) 606, and virtual-disk-file-system region(s) 606 may be mapped to one or more logical-volume region(s) 608. In at least one example, details of how a region-mapped entity is mapped to a region of a volume may be contained in a region map of the region-mapped entity.

The systems described herein may perform step 306 in any suitable manner. Generally, determining module 108 may determine that a region-mapped entity may be responsible for input/output to a region of a volume by determining that the region-mapped entity is mapped to the region of the volume. In one example, determining module 108 may determine that a region-mapped entity is mapped to a region of a volume by reading a configuration file associated with the region-mapped entity that indicates that the region-mapped entity is mapped to the region of the volume. For example, determining module 108 may determine that virtual disk 218(1) is mapped to one or more regions of logical volumes 224(1)-(N) by reading a region map of virtual disk 218(1) that identifies the volume regions to which virtual disk 218(1) is mapped.

In some examples, determining module 108 may identify the regions of one or more volumes to which a region-mapped entity within a virtual environment has been mapped by querying the virtual environment for mapping information that indicates how the region-mapped entity is mapped to volume regions. For example, determining module 108 may query virtualization layer 210 for a region map of virtual disk 218(1) and/or virtual disk 218(2).

In some examples, if a region-mapped entity is an application, determining module 108 may identify the regions of one or more volumes to which the application is mapped by determining that the application is configured to access a virtual disk and that the virtual disk is mapped to the regions of the one or more volumes. For example, determining module 108 may determine that application 216(1) is mapped to one or more regions of logical volume 224(1) by determining that application 216(1) is configured to access at least a portion of virtual disk 218(1) and that virtual disk 218(1) is mapped to the one or more regions of logical volume 224(1).

In at least one example, if a region-mapped entity is mapped to regions of a volume through multiple layers of abstraction, determining module 108 may determine that the region-mapped entity is mapped to the regions of the volume by identifying mappings at each layer of abstraction. Using FIG. 6 as an example, determining module 108 may determine that application 216(1) is mapped to logical-volume region(s) 608 by determining that application 216(1) is mapped to file-system region(s) 602, that file-system region(s) 602 are mapped to virtual-disk region(s) 604, that virtual-disk region(s) 604 are mapped to virtual-disk-file-system region(s) 606, and that virtual-disk-file-system region(s) 606 are mapped to logical-volume region(s) 608.

At step 308, one or more of the systems described herein may attribute the input/output statistic of the component to the region-mapped entity responsible for the input/output to the region of the volume. For example, at step 308 attributing module 110 may, as part of hypervisor 202 in FIG. 2, attribute an input/output statistic of a component that was monitored at step 304 to the region-mapped entity responsible for input/output to the region of the volume associated with the input/output statistic.

The systems described herein may perform step 308 in any suitable manner. In one example, attributing module 110 may attribute a region-level input/output statistic of a component that is attributable to input/output to a region of a volume to a region-mapped entity responsible for the input/output to the region of the volume by simply attributing the region-level input/output statistic of the component to a region-mapped entity that is mapped to the region of the volume. Using FIG. 4 as an example, attributing module 110 may attribute region-level statistics of one or more of the components of system 200 that are associated with regions 400(1)-(M) to virtual disk 218(1) and/or may attribute region-level statistics of one or more of the components of system 200 that are associated with regions 400(1)-(7) to application 216(1).

In some examples in addition to attributing input/output statistics to region-mapped entities, attributing module 110 may also determine how input/output traffic from a region-mapped entity is distributed across components of a storage area network based on the region-level input/output statistics of the components that have been attributed to the region-mapped entity. For example, attributing module 110 may obtain a region-mapped entity's input/output traffic distribution across the physical components of a storage area network by examining the loads of each physical component of the storage area network that have been attributed to the region-mapped entity. In at least one example, attributing module 110 may also perform various tasks (e.g., remediation of load imbalances) in response to discovering how input/output traffic of a region-mapped entity is distributed across the physical components of a storage area network. By determining how the input/output traffic of a region-mapped entity is distributed across a storage area network, the systems and methods described herein may aid in the detection and/or remediation of input/output bottlenecks in virtual environments that employ storage area networks.

In some examples in addition to attributing input/output statistics to region-mapped entities, attributing module 110 may also report the input/output statistics of components of a storage area network that have been attributed to region-mapped entities within the storage area network. For example, attributing module 110 may provide to an administrator a report that contains information that indicates how each region-mapped entity loads each component within a storage area network. Upon completion of step 308, exemplary method 300 in FIG. 3 may terminate.

As explained above, by (1) monitoring input/output traffic within storage area networks at a volume-region level and (2) determining how region-mapped entities (e.g., virtual disks or applications) are mapped to specific volume regions, the systems and methods described herein may attribute input/output statistics (e.g., load statistics) in storage area networks to the region-mapped entities that are responsible for them. Furthermore, in some examples, by attributing input/output statistics in storage area networks to region-mapped entities, these systems and methods may discover how input/output traffic of the region-mapped entities is distributed across the physical components of a storage area network. In certain examples, the systems and methods disclosed herein may also perform various tasks (e.g., remediation of load imbalances) in response to discovering how input/output traffic of region-mapped entities is distributed across the physical components of a storage area network.

For example, the systems and methods disclosed herein may (1) monitor an input/output statistic of a component of a storage area network that is attributable to input/output to a region of a volume, (2) determine that a virtual disk or an application is mapped to the region of the volume, and (3) attribute the input/output statistic of the component of the storage area network to the virtual disk or the application. In other examples, the systems and methods described herein may associate input/output requests obtained at a software layer of a hypervisor with the origin of the input/output request (e.g., a virtual-machine disk or an application) to generate statistics that indicate how the origin of the input/output requests loads physical components of a storage area network. In some examples, these statistics may aid in the detection and remediation of input/output bottlenecks in virtual environments.

Figure 7:
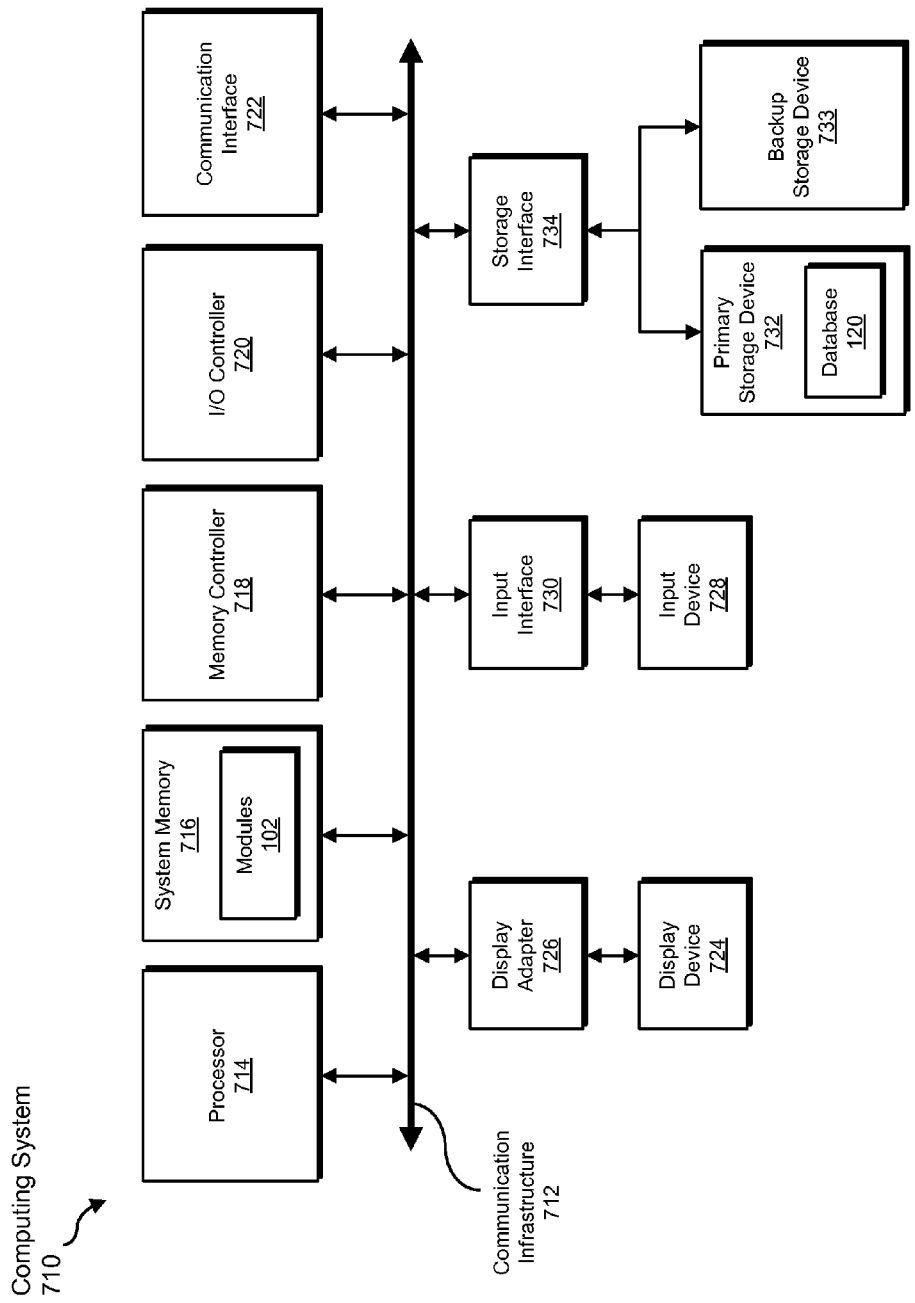
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
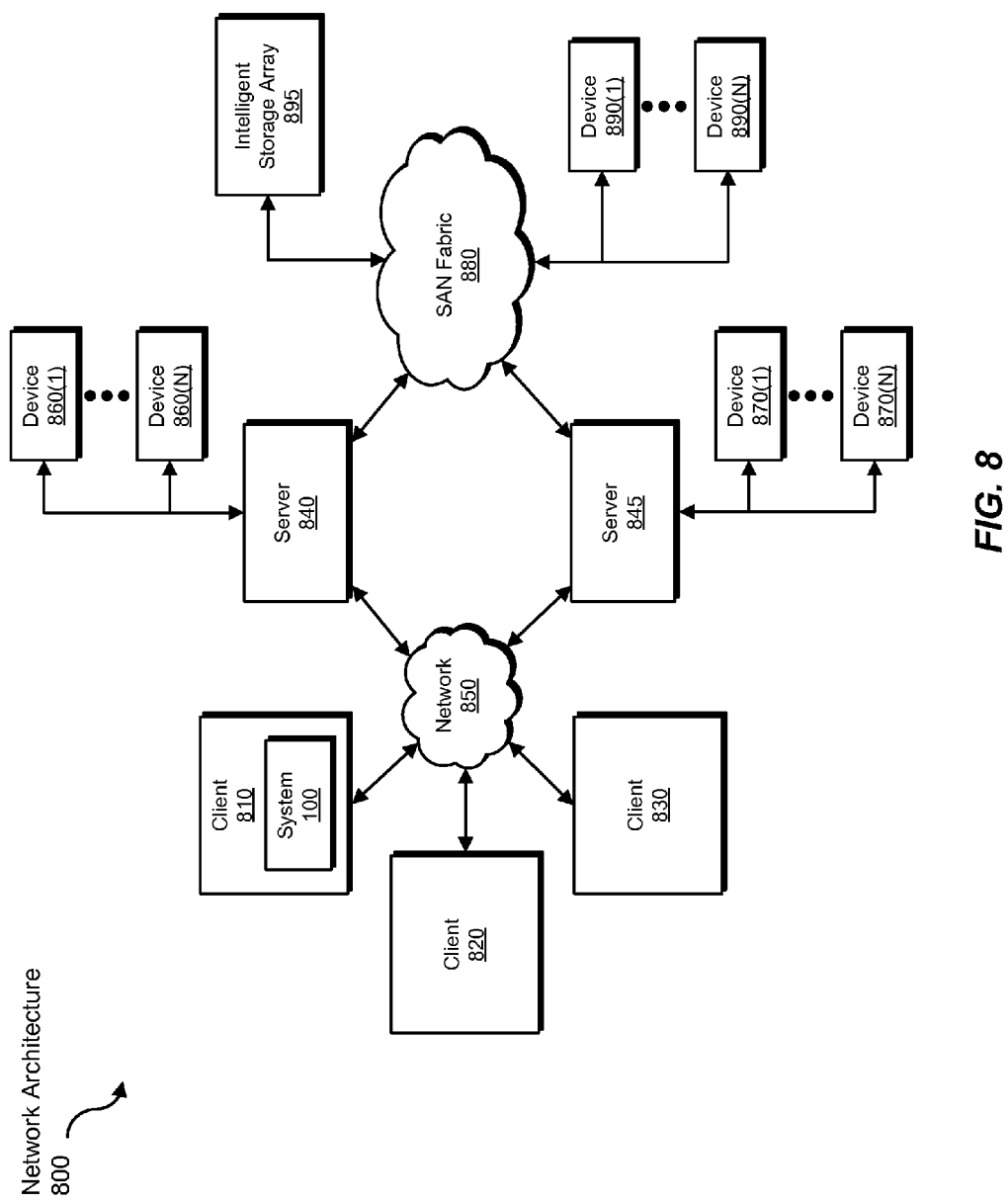
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for attributing input/output statistics in storage area networks to region-mapped entities.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive input/output requests that may not be attributed to any region-mapped entity, transform the input/output request into an input/output request that is attributed to a region-mapped entity, output a result of the transformation to a system for discovering how input/output traffic of the region-mapped entity is distributed within a storage area network, use the result of the transformation to discover how input/output traffic of the region-mapped entity is distributed within the storage area network, and store the result of the transformation to a system for tracking input/output statistics within storage area networks. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for attributing input/output statistics in storage area networks to region-mapped entities, at least a portion of the method being performed by a computing device comprising at least one processor, the method comprising:
receiving, from a virtualization layer that transforms virtualized input/output requests that are directed to a virtual disk into non-virtualized input/output requests that are directed to a volume within a storage area network, a non-virtualized input/output request to the volume within the storage area network, wherein:
the non-virtualized input/output request indicates an address of a region of the volume to which the non-virtualized input/output request is directed;
the virtualization layer transformed a virtualized input/output request to the virtual disk into the non-virtualized input/output request; and
the transformation of the virtualized input/output request into the non-virtualized input/output request prevents at least one component within the storage area network through which the non-virtualized input/output request is routed to the volume from identifying the virtual disk using only information within the non-virtualized input/output request;
using, at the component within the storage area network through which the non-virtualized input/output request is routed to the volume, the address indicated by the non-virtualized input/output request to monitor an input/output statistic of the component that is caused by input/output requests to the region;
querying the virtualization layer for information that indicates that a region-mapped entity is mapped to the region through one or more levels of abstraction; and
reporting, based at least in part on determining that the region-mapped entity is mapped to the region through one or more levels of abstraction, the input/output statistic of the component as being caused by the region-mapped entity.

2. The computer-implemented method of claim 1, wherein:
the region-mapped entity comprises the virtual disk;
the virtual disk was mapped by the virtualization layer to at least the region of the volume;
querying the virtualization layer for information that indicates that the region-mapped entity is mapped to the region comprises requesting, from the virtualization layer, an indication that the virtual disk was mapped by the virtualization layer to at least the region.

3. The computer-implemented method of claim 2, wherein:
the non-virtualized input/output request is received at a hypervisor through which the virtual disk is accessible;
reporting the input/output statistic of the component as being caused by the region-mapped entity comprises reporting the input/output statistic of the component as being caused by the virtual disk.

4. The computer-implemented method of claim 3, wherein the non-virtualized input/output request comprises:
identification information that indicates that the volume is the target of the non-virtualized input/output request;
at least one of an offset and a length that indicates that the address of the region of the volume is the target of the non-virtualized input/output request.

5. The computer-implemented method of claim 1, wherein:
the region-mapped entity comprises an application;
querying the virtualization layer for information that indicates that the region-mapped entity is mapped to the region through one or more levels of abstraction comprises requesting, from the virtualization layer, an indication that the virtualized input/output request to the virtual disk was received from the application.

6. The computer-implemented method of claim 5, wherein the indication indicates that the application is configured to access at least a portion of the virtual disk.

7. The computer-implemented method of claim 1, wherein querying the virtualization layer for information that indicates that the region-mapped entity is mapped to the region through one or more levels of abstraction comprises reading information that indicates that the region-mapped entity is mapped to the region through one or more levels of abstraction from a file maintained by the virtualization layer.

8. The computer-implemented method of claim 1, further comprising:
monitoring an additional input/output statistic of the component within the storage area network that is caused by non-virtualized input/output requests to an additional region of the volume;
querying the virtualization layer for information that indicates that an additional region-mapped entity is mapped to the additional region of the volume through one or more levels of abstraction;
reporting the additional input/output statistic of the component as being caused by the additional region-mapped entity.

9. The computer-implemented method of claim 8, wherein:
the additional region-mapped entity comprises a second virtual disk mapped to at least the additional region of the volume;
the virtual disk is separate and distinct from the second virtual disk.

10. The computer-implemented method of claim 1, wherein the component within the storage area network comprises at least one of:
a physical device within the storage area network;
a subcomponent of the physical device.

11. The computer-implemented method of claim 1, further comprising determining how input/output traffic for which the region-mapped entity is responsible is distributed across the storage area network.

12. The computer-implemented method of claim 1, wherein the component within the storage area network comprises a network switch.

13. A system for attributing input/output statistics in storage area networks to region-mapped entities, the system comprising:
an identifying module, stored in memory, that receives, from a virtualization layer that transforms virtualized input/output requests that are directed to a virtual disk into non-virtualized input/output requests that are directed to a volume within a storage area network, a non-virtualized input/output request to the volume within the storage area network, wherein:
the non-virtualized input/output request indicates an address of a region of the volume to which the non-virtualized input/output request is directed;
the virtualization layer transformed a virtualized input/output request to the virtual disk into the non-virtualized input/output request; and
the transformation of the virtualized input/output request into the non-virtualized input/output request prevents at least one component within the storage area network through which the non-virtualized input/output request is routed to the volume from identifying the virtual disk using only information within the non-virtualized input/output request;
a monitoring module, stored in memory, that uses, at the component within the storage area network through which the non-virtualized input/output request is routed to the volume, the address indicated by the non-virtualized input/output request to monitor an input/output statistic of the component that is caused by input/output requests to the region;
a determining module, stored in memory, that queries the virtualization layer for information that indicates that a region-mapped entity is mapped to the region through one or more levels of abstraction;
an attributing module, stored in memory, that reports the input/output statistic of the component as being caused by the region-mapped entity; and
at least one physical processor that executes the identifying module, the monitoring module, the determining module, and the attributing module.

14. The system of claim 13, wherein:
the region-mapped entity comprises the virtual disk;
the virtual disk was mapped by the virtualization layer to at least the region of the volume;
the determining module queries the virtualization layer for information that indicates that the region-mapped entity is mapped to the region by requesting, from the virtualization layer, an indication that the virtual disk was mapped by the virtualization layer to at least the region of the volume.

15. The system of claim 14, wherein:
the non-virtualized input/output request is received at a hypervisor through which the virtual disk is accessible
the attributing module reports the input/output statistic of the component as being caused by the region-mapped entity by reporting the input/output statistic of the component as being caused by the virtual disk.

16. The system of claim 15, wherein the non-virtualized input/output request comprises:
identification information that indicates that the volume is the target of the non-virtualized input/output request;
at least one of an offset and a length that indicates that the address of the region of the volume is the target of the non-virtualized input/output request.

17. The system of claim 13, wherein:
the region-mapped entity comprises an application;
the determining module queries the virtualization layer for information that indicates that the region-mapped entity is mapped to the region through one or more levels of abstraction by requesting, from the virtualization layer, an indication that the virtualized input/output request to the virtual disk was received from the application.

18. The system of claim 17, wherein the indication indicates that the application is configured to access at least a portion of the virtual disk.

19. The system of claim 13, wherein the region-mapped entity comprises one of a plurality of virtual disks accessible via a virtual machine.

20. A non-transitory computer-readable medium comprising one or more computer-executable instructions that, when executed by at least one processor of a computing device, cause the computing device to:
receive, from a virtualization layer that transforms virtualized input/output requests that are directed to a virtual disk into non-virtualized input/output requests that are directed to a volume within a storage area network, a non-virtualized input/output request to the volume within the storage area network, wherein:
the non-virtualized input/output request indicates an address of a region of the volume to which the non-virtualized input/output request is directed;
the virtualization layer transformed a virtualized input/output request to the virtual disk into the non-virtualized input/output request; and
the transformation of the virtualized input/output request into the non-virtualized input/output request prevents at least one component within the storage area network through which the non-virtualized input/output request is routed to the volume from identifying the virtual disk using only information within the non-virtualized input/output request;
use, at the component within the storage area network through which the non-virtualized input/output request is routed to the volume, the address indicated by the non-virtualized input/output request to monitor an input/output statistic of the component that is caused by input/output requests to the region;
query the virtualization layer for information that indicates that a region-mapped entity is mapped to the region through one or more levels of abstraction; and
report, based at least in part on determining that the region-mapped entity is mapped to the region through one or more levels of abstraction, the input/output statistic of the component as being caused by the region-mapped entity.

* * * * *

UNITED STATES PATENT AND TRADEMARK OFFICE
CERTIFICATE OF CORRECTION

| | |
|---|---|
| PATENT NO. | : 9,686,171 B1 |
| APPLICATION NO. | : 13/947780 |
| DATED | : June 20, 2017 |
| INVENTOR(S) | : Hari Krishna Vemuri |

It is certified that error appears in the above-identified patent and that said Letters Patent is hereby corrected as shown below:

The title of the Patent should read:
SYSTEMS AND METHODS FOR ATTRIBUTING INPUT/OUTPUT STATISTICS IN STORAGE AREA NETWORKS TO REGION-MAPPED ENTITIES Signed and Sealed this
Eighth Day of August, 2017

Joseph Matal
*Performing the Functions and Duties of the*
*Under Secretary of Commerce for Intellectual Property and*
*Director of the United States Patent and Trademark Office*